United States Patent
Samuelsson et al.

(10) Patent No.: US 9,228,446 B2
(45) Date of Patent: Jan. 5, 2016

(54) GAS TURBINE ENGINE COMPONENT

(75) Inventors: Rickard Samuelsson, Trollhättan (SE); Robert Reimers, Uddevalla (SE)

(73) Assignee: GKN Aerospace Sweden AB, Trollhattan (SE)

( * ) Notice: Subject to any disclaimer, the term of this patent is extended or adjusted under 35 U.S.C. 154(b) by 853 days.

(21) Appl. No.: 13/504,486

(22) PCT Filed: Oct. 27, 2009

(86) PCT No.: PCT/SE2009/000475
§ 371 (c)(1),
(2), (4) Date: May 4, 2012

(87) PCT Pub. No.: WO2011/053197
PCT Pub. Date: May 5, 2011

(65) Prior Publication Data
US 2012/0213633 A1 Aug. 23, 2012

(51) Int. Cl.
*F01D 9/04* (2006.01)

(52) U.S. Cl.
CPC ............ *F01D 9/042* (2013.01); *F05B 2260/301* (2013.01); *F05D 2230/18* (2013.01); *F05D 2240/12* (2013.01); *F05D 2260/31* (2013.01); *F05D 2260/37* (2013.01);
(Continued)

(58) Field of Classification Search
CPC ..... F01D 9/042; F01D 9/04; F05B 2260/301; F05D 2230/603
USPC ............. 415/191, 209.3, 209.4, 210.1, 211.1; 403/337, 408.1
See application file for complete search history.

(56) References Cited

U.S. PATENT DOCUMENTS

| | | | |
|---|---|---|---|
| 2,869,821 A | | 1/1959 | Halford et al. |
| 5,272,869 A | * | 12/1993 | Dawson et al. ................. 60/796 |
| 5,848,874 A | * | 12/1998 | Heumann et al. ............. 415/189 |

(Continued)

FOREIGN PATENT DOCUMENTS

| | | |
|---|---|---|
| DE | 1114204 B1 | 9/1961 |
| WO | 2008121047 A1 | 10/2008 |
| WO | WO 2008121047 A1 * | 10/2008 ................ F01D 9/04 |

OTHER PUBLICATIONS

Supplementary European Search Report (Aug. 4, 2014) for corresponding European App, EP 09 85 0930.
(Continued)

*Primary Examiner* — Igor Kershteyn
*Assistant Examiner* — Woody A Lee, Jr.
(74) *Attorney, Agent, or Firm* — Bejin Bieneman PLC

(57) ABSTRACT

A gas turbine engine component includes a ring element and a plurality of circumferentially spaced load carrying vanes extending in a radial direction of the ring element. At least one of the vanes is made of a composite material. The at least one composite vane is fastened to the ring element. The component further includes first and second wall portions that are fixed in relation to the ring element and arranged on opposite sides of the composite vane. At least a first hole extends through the first wall portion, the composite vane and the second wall portion. The first hole is adapted to receive a first insertion member. The component is arranged such as to, with regard to the first hole, provide a tight fit for the first insertion member in the first wall portion as well as in the composite vane and to provide a loose fit with a radial play in the second wall portion.

15 Claims, 4 Drawing Sheets

(52) U.S. Cl.
CPC ........ *F05D 2300/603* (2013.01); *Y02T 50/672* (2013.01); *Y02T 50/673* (2013.01)

(56) References Cited

U.S. PATENT DOCUMENTS

| | | | |
|---|---|---|---|
| 6,200,223 B1 * | 3/2001 | Martens | 464/99 |
| 6,213,719 B1 | 4/2001 | Violette et al. | |
| 6,220,815 B1 * | 4/2001 | Rainous et al. | 415/174.5 |
| 2005/0254944 A1 | 11/2005 | Bash et al. | |
| 2010/0111685 A1 * | 5/2010 | Sjunnesson et al. | 415/200 |

OTHER PUBLICATIONS

International Search Report for corresponding App. PCT/SE2009/000475.

* cited by examiner

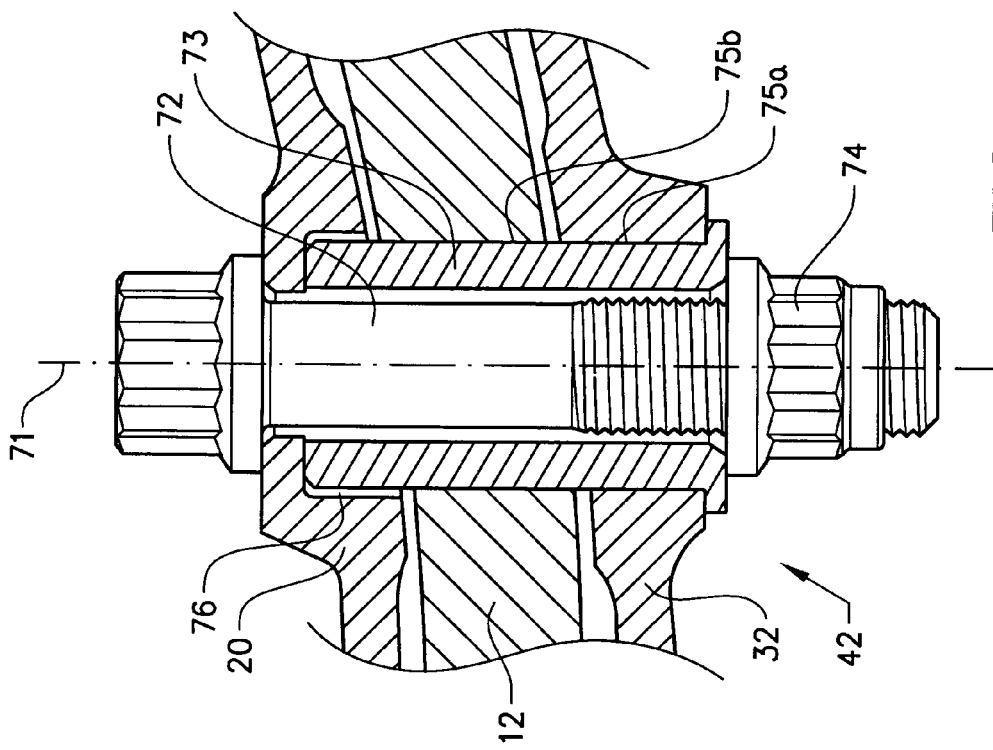
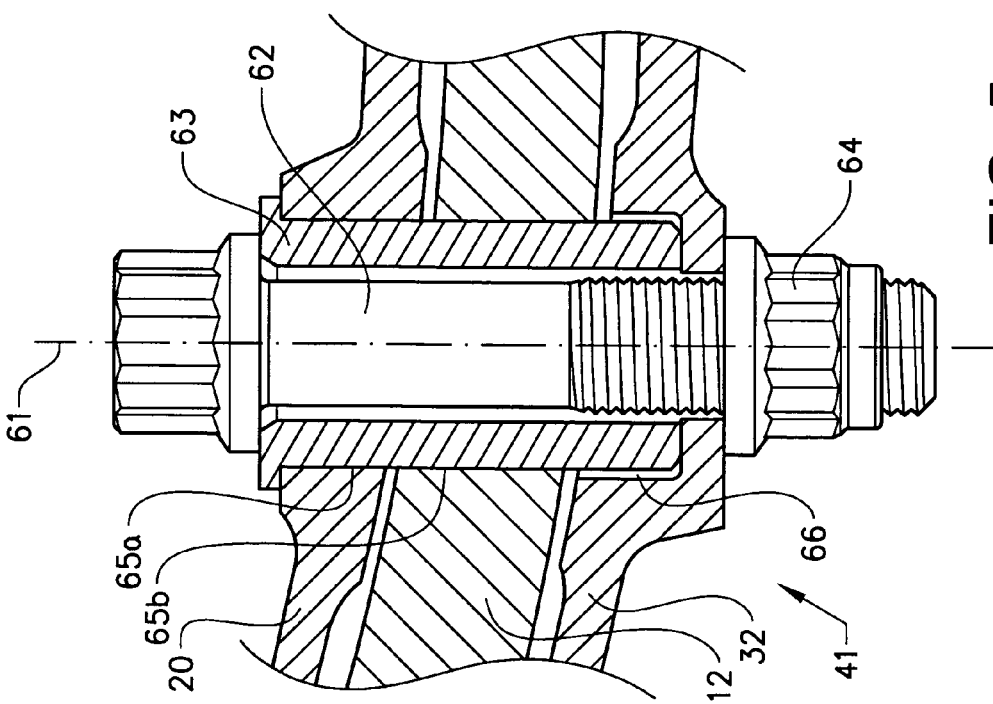

GAS TURBINE ENGINE COMPONENT

BACKGROUND AND SUMMARY

This invention relates to a gas turbine engine component. In particular, the invention relates to fastening of load carrying composite vanes to a ring element. The invention also relates to a gas turbine engine comprising such a component.

Turbojet engines often comprise a fan part with a gas/air channel defined by an outer ring (outer casing) and an inner ring (inner casing) connected by a plurality of air-guiding vanes and structural, load-carrying vanes that extend in a radial direction between the two rings. An engine mount is usually also provided by means of which the engine can be suspended in a frame, such as a wing of an aircraft. The engine mount is commonly attached to the above-mentioned outer ring. A structure of the type described above will be subjected to large mechanical forces upon operation of the engine and must be designed to withstand such conditions.

Conventionally, the vanes and the ring elements have been made of metal and fastening of the vanes to the ring elements has been achieved by means of bolt or rivet friction joints. However, for the purpose of saving weight there is an increasing interest of making use of vanes and ring elements made of a composite material such as a fibre-reinforced polymer.

Fastening of composite components is generally more complex than fastening of metal components. One reason is that composite materials have a tendency to relax mechanically during its lifetime, which results in that an initially applied clamping friction force is likely to decrease with time. Another reason is that a fibre-reinforced composite material usually exhibits different mechanical properties in different directions, which requires certain considerations regarding the transmission of forces through the fastening arrangement. Conventional friction joints are therefore normally not suitable for fastening e.g. a load-carrying composite vane to a ring element.

WO 2008/121047 discloses an arrangement for fastening a load carrying composite vane to a ring element using a ring element stiffening structure and a bracket member, wherein particular attention is paid to the subject of direction of forces.

There is still a need for improvements in this field, for instance regarding the problem related to the tendency of composite materials to relax mechanically during its lifetime.

It is desirable to provide a gas turbine engine component and gas turbine engine that exhibit improved properties concerning fastening of composite load-carrying vanes to a ring element compared to conventional gas turbine engines and components.

The invention concerns, according to an aspect thereof, a gas turbine engine component comprising: a ring element and a plurality of circumferentially spaced load carrying vanes extending in a radial direction of the ring element; wherein at least one of said vanes is made of a composite material, and wherein the at least one composite vane is fastened to the ring element, said component further comprising: first and second wall portions that are fixed in relation to the ring element and arranged on opposite sides of the composite vane; and at least a first hole extending through the first wall portion, the composite vane and the second wall portion, wherein said first hole is adapted to receive a first insertion member.

An aspect of the invention is characterized in that that the component is arranged such as to, with regard to the first hole, provide a tight fit for the first insertion member in the first wall portion as well as in the composite vane and to provide a loose fit with a radial play in the second wall portion.

In an aspect of the inventive design the tight fitting achieved between an insertion member, such as a bushing or a bolt, positioned in the first hole provides a fixed position of the vane in relation to the first wall portion. Thereby a rigid load path is provided without having to apply large clamping forces. A rigid load path is important for avoiding a gap/play that may result in sliding and reduced stiffness that limits the functionality during operation of engine. Moreover, tolerances can be taken up by the loose fit radial play in the second wall portion. Thus, tolerances can be taken up by adjusting the relative position of the wall portions. This is useful when providing a corresponding fixed position of the vane in relation to the second wall portion (for instance by a tight fit arrangement as described above) and when fastening the vane and wall portions to the ring element.

A known way of achieving a tight fit between a bolt or other insertion member and a hole that extends through a plurality of parts to be joined is line drilling, i.e. the parts to be joined are drilled through jointly in one operation. However, such line drilling has drawbacks in that it is relatively time-consuming and thereby costly, in that the parts will be unique and generally not replaceable and further in that the machining operation may be complex in case one part is in metal and another in composite material. In the inventive design a tight fit is provided without line drilling.

The terms tight fit and loose fit are well recognized terms for a person skilled in the art. A tight fit means that the hole has the same size (diameter) or is only slightly larger than the insertion member, in this case with a radial play of <0.1 mm and typically 0.015-0.1 mm. A loose fit means enough clearance to allow free play at any tolerance condition expected for the particular parts to be joined. Loose fit means in this case that the radial play to the insertion member is >0.3 mm and typically 0.4-0.6 mm.

In an advantageous embodiment of the invention the component comprises a second hole extending through the first wall portion, the composite vane and the second wall portion, wherein said second hole is adapted to receive a second insertion member, said first and second holes being positioned at a distance from each other as seen in an axial direction of the ring element, wherein the component further being arranged such as to, with regard to the second hole, provide a tight fit for the second insertion member in the second wall portion as well as in the composite vane and to provide a loose fit with a radial play in the first wall portion.

Thus, in this embodiment the insertion member in the second hole has a cross-wise opposite tight fit-loose fit as compared to the insertion member in the first hole. The tight fittings provide in this case a fixed position of the vane in relation to both the first and the second wall portions (without having to drill jointly). Tolerances can be taken up by the loose fittings in both wall portions which means that, if so required, the relative position of the two wall portions can be adjusted to allow insertion of both the first and second insertion member into the first and second holes, respectively. Further, a fastening arrangement comprising two holes and two corresponding insertion members, where the holes are positioned at a distance from each other as seen in an axial direction of the ring element, is well adapted to secure the vane to the ring element.

In a further embodiment of the invention the fastening arrangement is configured to allow adjustment of the relative positions of the first and second wall portions. Preferably, at least one of the wall portions forms part of a separate bracket member that is fastened to the ring element and to the composite vane. Such a separate bracket member can be easily be position-adjusted and fastened when assembling the component. Preferably, the separate bracket member is fastened to the ring element by means of a fastening device that allows its position to be adjusted. Such an arrangement can e.g. include bolt holes with sufficient tolerances and/or shims for adjusting the distance between bracket member and its point of attachment at the ring element In a further embodiment of the invention the first insertion member extends in the first hole along an axial direction thereof. In one embodiment the first insertion member is a bushing member. Preferably, the component comprises a fastening member that extends in an axial direction through the first hole, wherein the bushing member extends at least partly around and along the fastening member. In another embodiment the first insertion member is an elongated fastening member, such as a bolt or a rivet.

In a further embodiment of the invention a third hole is arranged in-between the first and second holes, wherein said third hole is adapted to receive a third insertion member, and wherein the component is arranged such as to, with regard to the third hole, provide a loose fit with a radial play for the third insertion member in the first and the second wall portions and to provide a tight fit in the in the composite vane. Such a design is useful for reducing vibrations.

In a further embodiment of the invention the component comprises an inner ring element and an outer ring element connected by said plurality of circumferentially spaced load carrying vanes.

In a further embodiment of the invention the component is configured to define a gas flow in a gas turbine engine, such as a turbo jet engine.

In a further embodiment of the invention the first and second wall portions are made of a metallic material.

The invention also concerns, according to another aspect thereof, a gas turbine engine comprising a gas turbine engine component of the above type.

BRIEF DESCRIPTION OF DRAWINGS

In the description of the invention given below reference is made to the following figure, in which:

FIGS. 5-6 show cross sections of first and second attachment points according to the inventive fastening arrangement.

DETAILED DESCRIPTION

Figure 1:
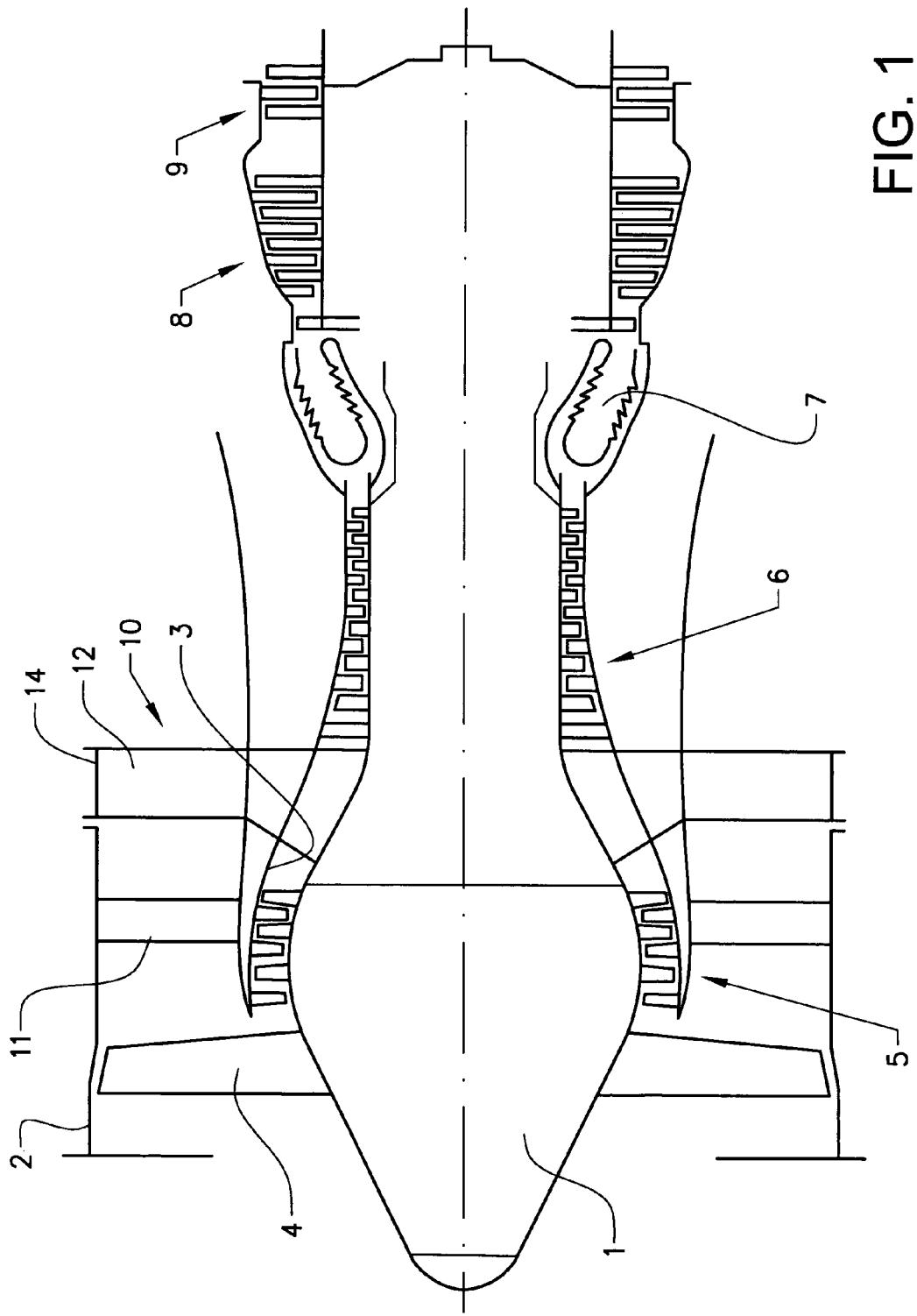
FIG. 1 shows, in a schematic view, a turbo-jet engine provided with a component according to the invention.

FIG. 1 shows a turbojet engine. The turbojet engine comprises a central body 1, an annular outer casing 2 (fan casing), an annular inner casing 3 (engine casing), a fan or blower 4, a low pressure compressor 5, a high pressure compressor 6, a combustion chamber 7, a high pressure turbine 8 and a low pressure turbine 9. It further comprises a set of arms 10 extending in a radial direction from the inner casing 3 to an outer ring element 14 forming part of the outer casing 2. The arms 10 comprise aerodynamic vanes 11 primarily provided to act as guide vanes for air passing through the annular channel between the inner casing 3 and the outer casing 2 in an axial direction, i.e. a longitudinal direction, of the engine. The arms 10 further comprise structural arms or load carrying vanes 12 primarily provided to guarantee a certain mechanical strength of the construction. Here, the aerodynamic vanes 11 and the load carrying vanes 12 are arranged in axially separated sets of arms. However, they could as well be arranged in an interleaving relation in one and the same set of arms. Further, a single arm may have both an aerodynamic function and a load carrying function.

The flow through the turbojet engine is divided into two major streams, a first one of which passes through an annular channel between the central body 1 and the inner casing 3, and passes the compressors 5, 6, the combustion chamber 7 and the turbines 8, 9. A second stream passes through the annular channel between the inner casing 3 and the outer casing 2. A temperature of the second stream is in operation lower than a temperature of the first stream, but the second stream substantially increases the thrust of the turbojet engine. An engine mount 13 (see FIG. 2) is arranged onto the outer ring element 14 by means of which the turbojet engine is attached to and held in position in relation to an aircraft.

Figure 2:
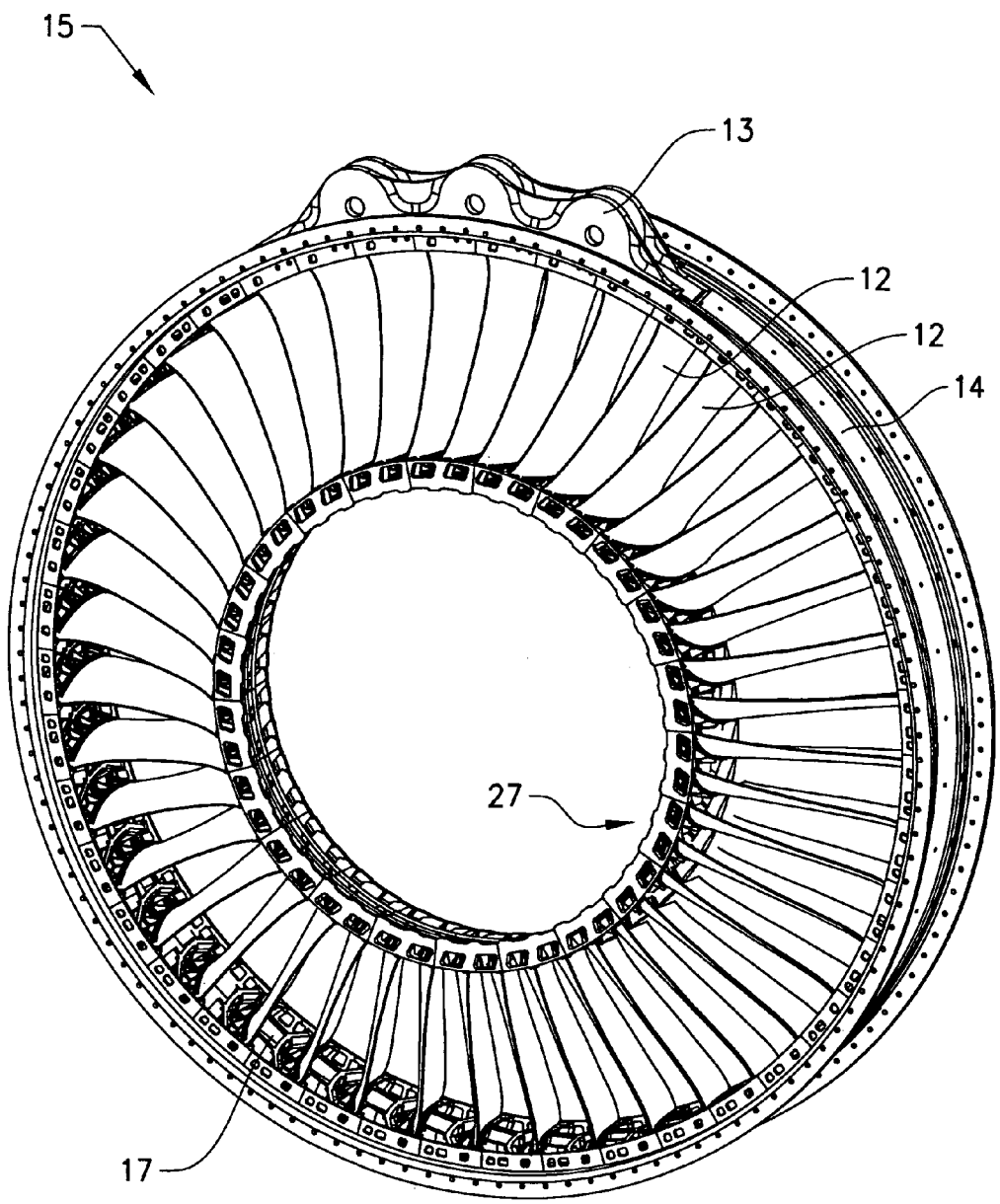
FIG. 2 shows, in a perspective view, an embodiment of the inventive component.

FIGS. 2-6 show an embodiment of a gas turbine engine component 15 according to the invention. As shown in FIG. 2, the component 15 comprises an outer ring element 14 that forms part of the outer casing 2, an inner ring element 27 that forms part of the inner casing 3, and a plurality of circumferentially spaced load carrying vanes 12 that extends in a radial direction of the outer and inner ring elements 14, 27 and that connects the two ring elements 14, 27. FIG. 2 further shows the engine mount 13. The outer ring 14 comprises a wall structure in the form of a sheet with main surfaces facing in a radial direction.

In the embodiment shown the extension direction of the load carrying vanes 12 coincides with a radial direction of the component 15. However, according to an alternative, the load carrying vanes may be arranged with an inclination (preferably <30°) in relation to the radial direction of the component.

The load carrying vanes 12 are made of a fibre-reinforced light weight polymer material, with a density below that of, for example, light weight metals such as aluminum and titanium. Vanes of this type are, as such, well known to a person skilled in the art. Further, the load carrying vanes 12 have an aerodynamically adapted cross-section, with a leading upstream edge and a trailing downstream edge as seen in the axial direction, i.e. the flow direction through the channel between the outer ring 14 and the inner casing 3. It is not necessary for the invention that all vanes are made of a composite material; some vanes may be made of metal. Neither is it necessary that the load carrying vanes 12 have an aerodynamically adapted cross-section.

Figure 3:
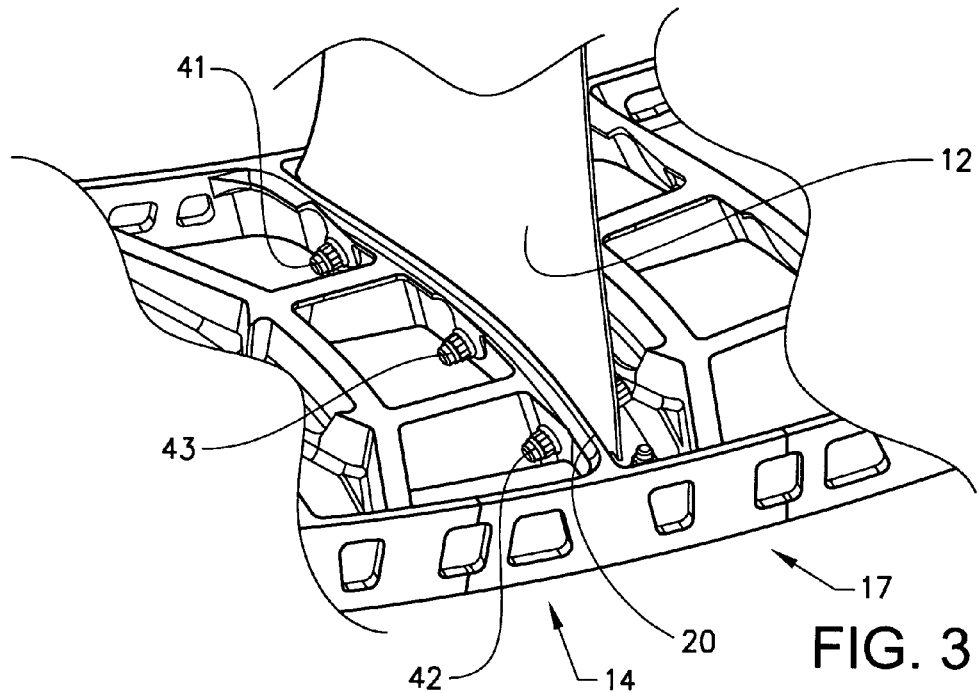
FIGS. 3-4 show a fastening arrangement according to the invention.
Figure 4:
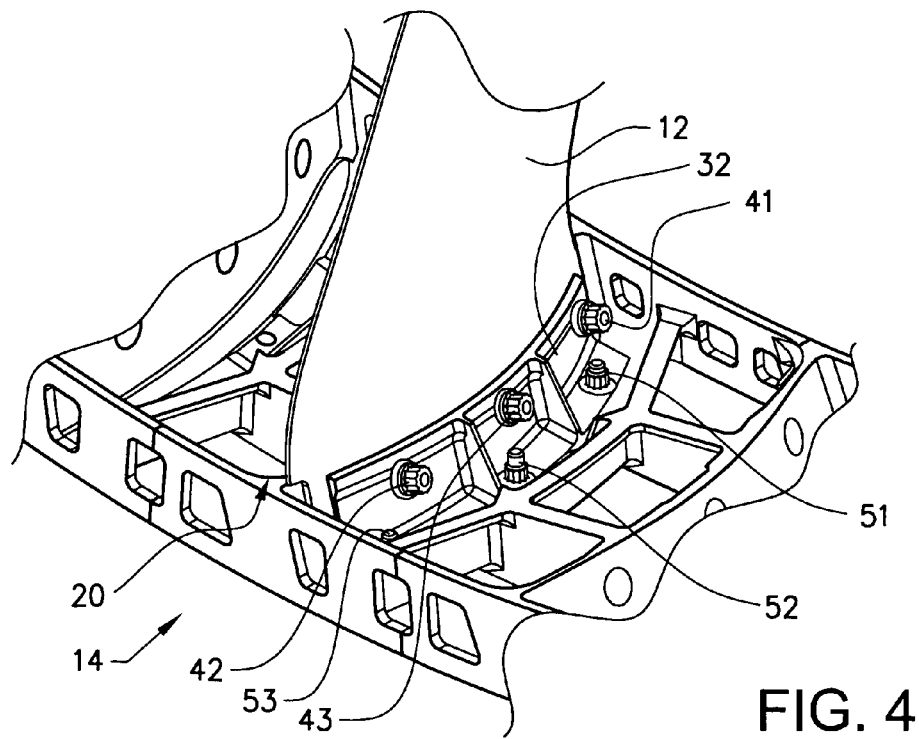

FIGS. 3-4 show in an enlarged view a fastening arrangement configured to fasten the composite vane 12 to the outer ring element 14. In the example shown here the outer ring element 14 comprises various parts including a framework structure 17 shown in FIGS. 3-4. The framework structure 17 comprises in turn a wall portion 20 extending substantially in an axial direction of the outer ring element 14 and exhibiting a surface facing substantially in a circumferential direction of the ring element 14, which surface is intended to bear on a (curved) side of the vane 12 at an outer end thereof. Thus, the wall portion 20 is configured to allow positioning of the outer end of the load carrying vane 12 in a parallel, overlapping relationship. Further, the wall portion 20 is configured to form a rigid point of attachment for the load carrying vane 12. In short, the wall portion 20 forms a first bracket member for fastening the composite vane 12 to the outer ring element 14.

A second wall portion 32 that forms part of a separate bracket member, which in this example has an L-shaped cross-section, is shown in FIG. 4. The second wall portion 32 is positioned in a parallel, overlapping relationship with the outer end side of the load carrying vane 12 but on the opposite side of the vane 12 as compared to the first wall portion 20. In similarity with the first wall portion 20, the second wall portion 32 is slightly curved as to be adapted to the shape of the vane 12. The separate bracket member comprising the second wall portion 32 is fastened to the outer ring element 14 by means of bolts 51-53. Thus, in this case the first wall portion 20 forms a one-piece unit with the ring element 14 (i.e. with the framework structure 17), whereas the second wall portion 32 forms part of a separate (attachable/detachable) part.

The first and second wall portions 20, 32, as well as the framework structure 17 and the remaining parts of the separate bracket member, are in this case made of a metallic material.

The composite vane 12 is fastened to the first and second wall portions 20, 32, and thereby to the ring element 14, at first, second and third attachment points 41-43 distributed in an axial direction of the ring element 14 with the first point 41 positioned closest to the leading upstream edge of the vane 12, the second point 42 positioned closest to the trailing downstream edge of the vane 12, and the third point 43 positioned in between the first and second attachment points 41, 42. Accordingly, the first and second attachment points 41, 42 are positioned at a distance from each other as seen in an axial direction of the ring element 14.

FIGS. 5 and 6 show cross sections of the first and second attachment points 41, 42, respectively. As can be seen in FIG. 5, the first attachment point 41 of the fastening arrangement comprises a first hole (indicated by centre axis 61) arranged such as to extend through the first wall portion 20, the composite vane 12 and the second wall portion 32, wherein said first hole 61 is adapted to receive a first insertion member in the form of a first bushing member 63. It further comprises fastening elements in the form of a first bolt member 62 inserted through the first bushing member 63 and a first nut member 64 screwed onto the first bolt member 62. Similarly, FIG. 6 shows that the second attachment point 42 of the fastening arrangement comprises a second hole (indicated by centre axis 71) arranged such as to extend through the first wall portion 20, the composite vane 2 and the second wall portion 32, wherein said second hole 71 is adapted to receive a second insertion member in the form of a second bushing member 73. It further comprises fastening elements in the form of a second bolt member 72 inserted through the second bushing member 73 and a second nut member 74 screwed onto the second bolt member 72. Thus, said first and second holes 61, 71 are positioned at a distance from each other as seen in an axial direction of the ring element 14.

Each first and second hole 61, 71 comprises a set of three coinciding and co-axial holes arranged in the first wall portion 20, in the vane 12 and in the second wall portion 32, respectively.

The bushing members 63, 73, the bolt members 62, 72 and the nut members 64, 74 are all made in metallic material.

The fastening arrangement of the component 15 is arranged such as to, with regard to the first hole 61, provide a tight fit 65a, 65b for the first insertion member, i.e. in this case the first bushing member 63, in the first wall portion 20 as well as in the composite vane 12 and to provide a loose fit 66 with a radial play in the second wall portion 32. Moreover, the fastening arrangement is arranged such as to, with regard to the second hole 71, provide a tight fit 75a, 75b for the second insertion member, i.e. in this case the second bushing member 73, in the second wall portion 32 as well as in the composite vane 12 and to provide a loose fit 76 with a radial play in the first wall portion 20. Thus, the second bushing member 73 arranged in the second hole 71 has a cross-wise opposite tight fit-loose fit as compared to the first bushing member 63 arranged in the first hole 61.

That the fit is tight means in principle that the diameter of the hole is as small as possible without making it (too) difficult to insert the corresponding insertion member, i.e. in this case the corresponding bushing member. A small radial play will normally be present in a tight fit. A typical tight fit radial play is in this application around 0.015-0.1 mm. The radial play may be further reduced by cooling/shrinking the insertion member before insertion. That the fit is loose means that there is room for taking up tolerances, which is the regular way of arranging screw joints of this type. A typical loose fit radial play is in this application around 0.4-0.6 mm. The values given for the radial play refers to the total play in the radial direction of the hole, i.e. the radial play on a certain side of the hole is the same as the values given above if the insertion member is centred in the hole.

The tight fittings provide in this case a fixed position of the vane in relation to both the first and the second wall portion 20, 32. This provides for a rigid loadpath between the vane 12 and the ring element 14. Since the parts that are clamped together are made of metallic material there is no problem related to the tendency of composite materials to relax mechanically during its lifetime.

Tolerances can be taken up by the loose fittings 66, 76 in the two wall portions 20, 32. This means that, if so required, the relative position of the two wall portions 20, 32 can be adjusted to allow insertion of both the first and second insertion member 63, 73 into the first and second holes 61, 71, respectively. In this case the first wall portion 20 forms part of the ring element 14 which means that in practice it will be the second, separate bracket member 32 that will be adjusted in position in relation to the first wall portion/bracket member 20 when assembling the component 15. Of course, both wall portions 20, 32 may alternatively form part of separate bracket members that are attached directly or indirectly to vane 12 and ring element 14. What is important is that relative position adjustment between the wall portions 20, 32 is allowed when fitting them to the vane 12.

Position adjustment of a wall portion of a separate bracket member in relation to ring element 14 may be carried out e.g. by having sufficient tolerance in holes in bracket and/or ring element used for fastening (e.g. holes for bolt joints 51-53) and/or by using shims to adjust distance between bracket member and ring element 14.

The component 15 is arranged in such a way that the first and second holes 61, 71 provide a certain fit for the first and second insertion members 63, 73, which in this case are bushing members. Each bushing member 63, 73 is adapted to the size of its corresponding hole and is an elongated insertion member that extends in an axial direction through at least a great deal of the corresponding hole. Further, each bushing member 63, 73 extends at least partly around and along a fastening element, i.e. the corresponding bolt member 62, 72, that in turn extends in an axial direction through the corresponding hole. A more sophisticated bushing arrangement, e.g. something in line with what is disclosed in WO 2008/121047, may be used. On the other hand, bushing members are not necessary for the invention described here. The insertion member adapted to provide a certain fit when inserted into any of the holes may be an elongated fastening element, such as a bolt or a rivet.

The third attachment point 43 is in this example in principal similar to the first and second attachment points 41, 42 and comprises a third hole extending through the vane 12 and the wall portions 20, 32 as well as an elongated insertion member inserted through the third hole. However, in the third attachment point there is a tight fit provided only in the vane 12; the fit in both the first and second wall portions 20, 32 is loose.

Thereby, a third insertion member (e.g. a third bushing or bolt member), can be inserted through the third hole also after some adjustment of the relative position of the bracket members 20, 32. The function of the third attachment point is mainly to reduce vibrations.

The outer ring 14 may comprise a light weight material such as a fibre-reinforced composite. The outer ring 14 may, as in the shown embodiment, be of annular shape and may have a length in the longitudinal, i.e. axial direction of the engine corresponding to the extension of each of the arms 12 in said axial direction. The ring 14 may further be configured for transferring axial loads between upstream and downstream gas turbine components.

The invention has above been described for a static application in a gas turbine engine. However, the invention may also be applied in a rotational component, such as a fan and wherein there are provided aerodynamic guide vanes for the guiding of gases in a by pass channel of the engine. The invention may be used for any assembled/fabricated metal/composite structure.

In a broad sense, the invention relates to all kinds of structures in turbojet engines wherein there is a plurality of arms, typically vanes or load carrying vanes, connected to a ring element. For example, such structural vanes may be arranged in an engine core gas channel, but also in a fan section of an engine type where the fan section is arranged in a common gas channel upstream of a division into a core gas channel and a bypass gas channel.

The term "ring element", as referred to herein, may comprise only a part, i.e. a sector, of a ring, or a continuous full ring. Further, the ring element may form part of a housing, casing, or other similar component.

The invention is not limited by the embodiments described above but can be modified in various ways within the scope of the claims. For instance, the first hole 61 does not necessarily have to have the same diameter along its entire length. For instance, the part of the first hole 61 extending through the vane 12 may have a smaller diameter. In such a case the inventive tight-loose fitting can be achieved by providing the insertion member with a diameter that varies over its length in a way corresponding to that of the first hole 61. A similar alternative is possible also for the second hole 71.

In the embodiment described the inventive fastening arrangement has been used to fasten load carrying vanes 12 to the outer ring element 14 of the gas turbine component 15. However, the invention is applicable also for fastening the load carrying vanes 12 to the inner ring element 27, i.e. it can be used on the inner and/or the outer ring element.

Separate bracket members, such as the bracket member providing the second wall portion 32, may be fastened to the ring element 14 in different ways. For instance, as an alternative or complement to what is described above a separate bracket member can be fastened to a flange of the ring element 14 with fastening elements, e.g. bolts, arranged in an axial direction of the ring element 14.

The invention claimed is:

1. Gas turbine engine component, comprising;
   a ring element;
   a plurality of circumferentially spaced load carrying vanes extending in a radial direction of the ring element; wherein at least one of the vanes is made of a composite material, and wherein the at least one composite vane is fastened to the ring element;
   first and second wall portions that are fixed in relation to the ring element and arranged on opposite sides of the composite vane; and
   at least a first hole extending through the first wall portion, the composite vane and the second wall portion, wherein the first hole is adapted to receive a first insertion member,
   wherein the component is arranged such as to, with regard to the first hole, provide a tight fit for the first insertion member in the first wall portion as well as in the composite vane and to provide a loose fit with a radial play in the second wall portion; and
   further wherein the component comprises a second hole extending through the first wall portion, the composite vane and second wall portion, wherein the second hole is adapted to receive a second insertion member, the first and second holes being positioned at a distance from each other as seen in an axial direction of the ring element, wherein the component further being arranged such as to, with regard to the second hole, provide a tight fit for the second insertion member in the second wall portion as well as in the composite vane and to provide a loose fit with a radial play in the first wall portion.

2. Gas turbine engine component according to claim 1, wherein the component is configured to allow adjustment of the relative positions of the first and second wall portions.

3. Gas turbine engine component according to claim 2, wherein at least one of the wall portions forms part of a separate bracket member that is fastened to the ring element and to the composite vane.

4. Gas turbine engine component according to claim 3, wherein the separate bracket member is fastened to the ring element by means of a fastening device that allows its position to be adjusted.

5. Gas turbine engine component according to claim 1, wherein the first insertion member extends in the first hole along an axial direction thereof.

6. Gas turbine engine component according to claim 1, wherein the first insertion member is a bushing member.

7. Gas turbine engine component according to claim 6, wherein the component comprises a fastening member that extends in an axial direction through the first hole and that the bushing member extends at least partly around and along the fastening member.

8. Gas turbine engine component according to claim 1, wherein the first insertion member is an elongated fastening member, such as a bolt or a rivet.

9. Gas turbine engine component according to claim 1, wherein a third hole is arranged in-between the first and second holes, wherein the third hole is adapted to receive a third insertion member, and wherein the component is arranged such as to, with regard to the third hole, provide a loose fit with a radial play for the third insertion member in the first and second wall portions and to provide a tight fit in the in the composite vane.

10. Gas turbine engine component according to claim 1, wherein the tight fit corresponds to a radial play of ≤0.1 mm and that the loose fit corresponds to a radial play of >0.3 mm.

11. Gas turbine engine component according to claim 1, wherein the component comprises an inner ring element and an outer ring element connected by the plurality of circumferentially spaced load carrying vanes.

12. Gas turbine engine component according to claim 1, wherein the component is configured to define a gas flow in a gas turbine engine.

13. Gas turbine engine component according to claim 1, wherein the first and second wall portions are made of a metallic material.

14. Gas turbine engine, wherein it comprises a component according to claim 1.

15. Gas turbine engine component according to claim 12, wherein the gas turbine engine is a turbo jet engine.

* * * * *